(12) United States Patent
Peterson et al.

(10) Patent No.: US 10,768,699 B2
(45) Date of Patent: Sep. 8, 2020

(54) PRESENTATION TO USER OF INDICATION OF OBJECT AT WHICH ANOTHER PERSON IS LOOKING

(71) Applicant: Lenovo (Singapore) Pte. Ltd., New Tech Park (SG)

(72) Inventors: Nathan J. Peterson, Oxford, NC (US); Gary David Cudak, Wake Forest, NC (US); John Scott Crowe, Durham, NC (US); Jennifer Lee-Baron, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/126,567

(22) Filed: Sep. 10, 2018

(65) Prior Publication Data

US 2020/0081525 A1 Mar. 12, 2020

(51) Int. Cl.
*G06F 3/01* (2006.01)
*G02B 27/01* (2006.01)
(Continued)

(52) U.S. Cl.
CPC .............. *G06F 3/013* (2013.01); *B60K 35/00* (2013.01); *G02B 27/0172* (2013.01); *G06F 3/012* (2013.01); *G06F 3/017* (2013.01); *G06F 3/167* (2013.01); *B60K 2370/186* (2019.05); *B60K 2370/334* (2019.05); *G02B 2027/014* (2013.01);
(Continued)

(58) Field of Classification Search
CPC .......... G06F 3/013; G06F 3/012; G06F 3/017; G06F 3/011; G06F 3/167; G06F 3/01; G06F 3/00; G06F 3/16; B60K 35/00; B60K 2370/186; B60K 2370/334; B60K 2370/18; B60K 2370/00; B60K 2370/33; B60K 2370/20; G02B 27/0172; G02B 2027/0138; G02B 2027/014; G02B 27/0101; G02B 27/01; G02B 27/00; G02B 27/017

See application file for complete search history.

(56) References Cited

U.S. PATENT DOCUMENTS

| 4,045,885 | A * | 9/1977 | Stern ...................... | G09B 27/02 434/286 |
| 6,798,443 | B1 * | 9/2004 | Maguire, Jr. ........... | G06F 3/011 345/8 |

(Continued)

FOREIGN PATENT DOCUMENTS

WO WO-2015133889 A1 * 9/2015 ............. G06F 3/013

OTHER PUBLICATIONS

Liviu Marica, "Back Seat Transparent Touchscreen Window", Jul. 24, 2011, https://www.youtube.com/watch?v=ct6dpX7dZzl (Year: 2011).*

(Continued)

*Primary Examiner* — Julie Anne Watko
(74) *Attorney, Agent, or Firm* — John L. Rogitz; John M. Rogitz

(57) ABSTRACT

In one aspect, a device includes at least one processor, a display accessible to the at least one processor, and storage accessible to the at least one processor. The storage includes instructions executable by the at least one processor to receive input regarding an object at which one person is looking and to present, to another person via the display, a graphical indication regarding the object.

18 Claims, 7 Drawing Sheets

(51) Int. Cl.
*G06F 3/16* (2006.01)
*B60K 35/00* (2006.01)
(52) U.S. Cl.
CPC ...... *G02B 2027/0138* (2013.01); *G06F 3/011* (2013.01)

(56) References Cited

U.S. PATENT DOCUMENTS

| | | | |
|---|---|---|---|
| 8,922,480 B1* | 12/2014 | Freed | G09G 5/00 345/156 |
| 9,117,066 B2* | 8/2015 | Nathan | G06F 21/32 |
| 2008/0001847 A1* | 1/2008 | Kratchounova | G01C 23/00 345/1.1 |
| 2012/0242591 A1* | 9/2012 | Kawalkar | G06F 3/013 345/173 |
| 2015/0116212 A1* | 4/2015 | Freed | G09G 5/00 345/156 |
| 2016/0224106 A1* | 8/2016 | Liu | G06F 3/013 |
| 2019/0126824 A1* | 5/2019 | Oba | B60R 1/00 |

OTHER PUBLICATIONS

Corning Incorporated, "Day Made of Glass 2: Same Day. Expanded Corning Vision (2012)", Feb. 3, 2012, https://www.youtube.com/watch?v=jZkHpNnXLB0 (Year: 2012).*

"Wii U SiNG Party Official Trailer", https://www.youtube.com/watch?v=TGdnj7APnJo (Year: 2013).*

Tönnis and Klinker, "Effective Control of a Car Driver's Attention for Visual and Acoustic Guidance towards the Direction of Imminent Dangers", Proceedings of the ISMAR. 13-22, Oct. 1, 2006, 10.1109/ISMAR.2006.297789. (Year: 2006).*

* cited by examiner

PRESENTATION TO USER OF INDICATION OF OBJECT AT WHICH ANOTHER PERSON IS LOOKING

BACKGROUND

As recognized herein, users of respective augmented reality devices are sometimes proximate to each other but are not looking in similar directions. This may be problematic if a first user is viewing a virtual object anchored to a real-world location that is not currently in a second user's current field of view, but the first user still says something opaque to the second user along the lines of "look at that". As also recognized herein, logically the second user may not be able to deduce the location and identity of the virtual object that is being referenced by the first user since the virtual object might not be within the current field of view for the second user. There are currently no adequate solutions to the foregoing computer-related, technological problem regarding shared augmented reality experiences.

SUMMARY

Accordingly, in one aspect a device includes at least one processor, a display accessible to the at least one processor, and storage accessible to the at least one processor. The storage includes instructions executable by the at least one processor to receive input regarding an item at which a person is looking and to present information regarding the item to a user via the display.

In another aspect, a method includes receiving input regarding an object at which a person is looking and presenting, on an electronic display, a graphical indication regarding the object to a user.

In still another aspect, a computer readable storage medium (CRSM) that is not a transitory signal includes instructions executable by at least one processor to identify, at a first device, information related to an object being observed by a user. The instructions are also executable to transmit, to a second device, data regarding the location of the object.

The details of present principles, both as to their structure and operation, can best be understood in reference to the accompanying drawings, in which like reference numerals refer to like parts, and in which:

DETAILED DESCRIPTION

Figure 1:
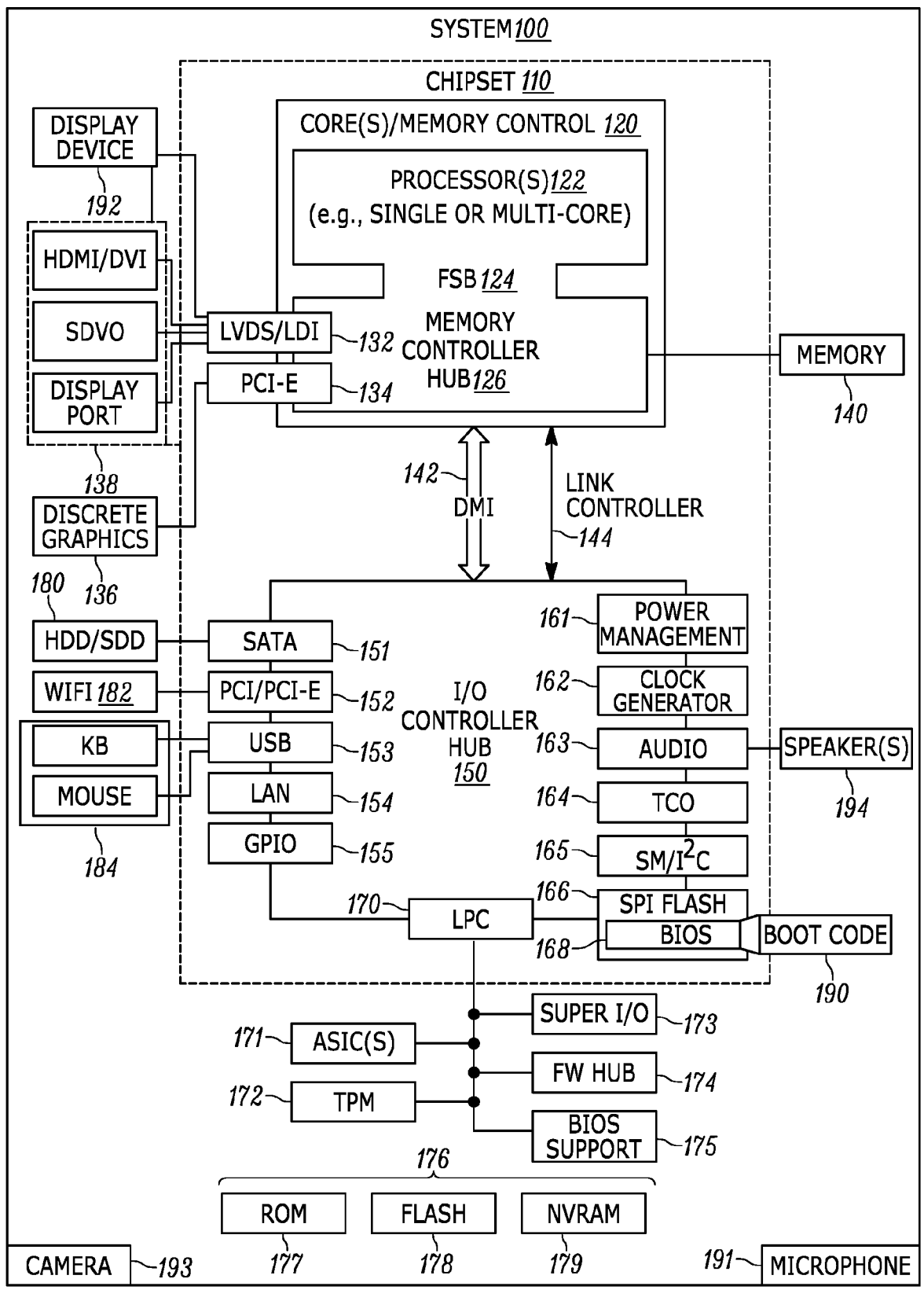
FIG. 1 is a block diagram of an example system in accordance with present principles.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any conventional general-purpose single- or multi-chip processor that can execute logic by means of various lines such as address lines, data lines, and control lines and registers and shift registers. Moreover, any logical blocks, modules, and circuits described herein can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C # or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case, the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Still further, the system 100 may include an audio receiver/microphone 191 that may provide input from the microphone to the processor 122 based on audio that is detected, such as via a person speaking as described herein. The system may also include one or more cameras 193 that may gather one or more images and provide them and related input to the processor 122. The camera(s) 193 may be a thermal imaging camera, a digital camera such as a webcam, an infrared (IR) camera, a three-dimensional (3D) camera, and/or a camera otherwise integrated into the system 100 and controllable by the processor 122 to gather pictures/images and/or video.

Additionally, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Also, the system 100 may include a GPS transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
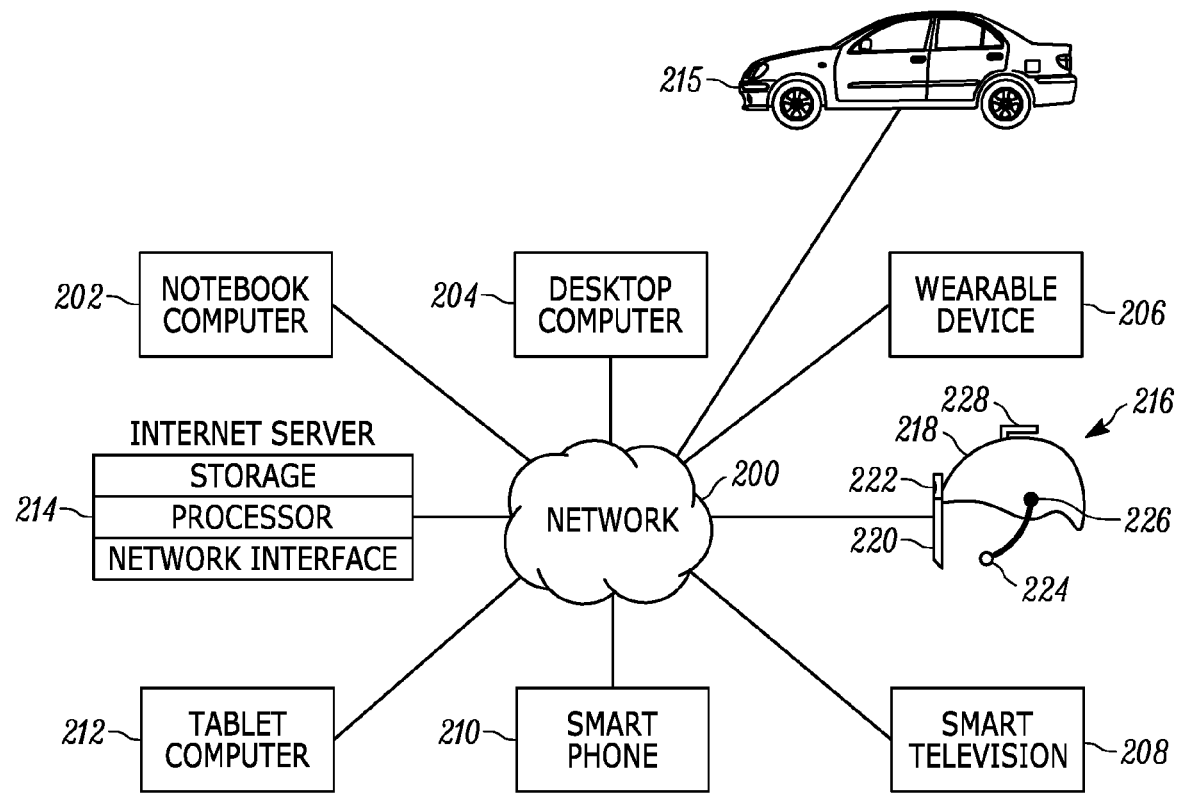
FIG. 2 is a block diagram of an example network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a vehicle 215, a headset 216, and a server 214 such as an Internet server that may provide cloud storage accessible to the devices 202-212 and 216. It is to be understood that the devices 202-216 are configured to communicate with each other over the network 200 to undertake present principles.

Describing the headset 216 in more detail, it may be an augmented reality (AR) headset in some examples, while it may be Internet-enabled computerized glasses in other examples. Still other types of headsets may also be used to present content as disclosed herein, such as a virtual reality (VR) headset that may present a camera feed of the user's real-world environment on its display so that content as described herein can be overlaid on the camera feed.

The headset 216 may include a housing 218 to which a display 220 is coupled for presenting content in accordance with present principles. In AR scenarios, the display 220 may be an at least partially transparent display such as a "heads-up" display that may permit a wearer of the headset to view real-world objects through it while wearing the headset 216, with the display also being configured to present content on the display 220 itself such AR images/graphics and other content as disclosed herein.

The headset 216 may also include plural cameras 222 that may each be similar in function and configuration to the camera 193 described above, with at least one of the cameras 222 oriented to image a wearer's eyes while the user wears the headset 216. The images may then be processed using eye tracking software for infrared (IR) and other types of eye tracking in accordance with present principles.

Another one of the cameras 222 may be oriented away from the headset 216 to image the user's environment according to a field of view of the user to identify real-world objects being looked at by the user as disclosed herein and to also help identify any gesture input that might be performed by the user in free space while wearing the headset 216. Accordingly, the camera(s) oriented away from the headset 216 to image the user's environment may be juxtaposed on the bridge of the headset 216 that extends between a user's eyes and over the user's nose while wearing the headset 216.

The headset 216 may also include a microphone 224 that may be similar in function and configuration to the microphone 191 for receiving voice input, a speaker 226 that may be similar in function and configuration to the speaker(s) 194, and one or more head-engagement members 228 for a user to dispose the headset 216 on his or her head. Though not shown for clarity, it is to be understood that the headset 216 may also include a network interface for wired and/or wireless communication with the other devices of FIG. 2 such as via the Internet, a local area network (LAN), a Bluetooth network, etc. The headset 216 may also include a processor, storage, a battery pack or other power source, etc.

Figure 3:
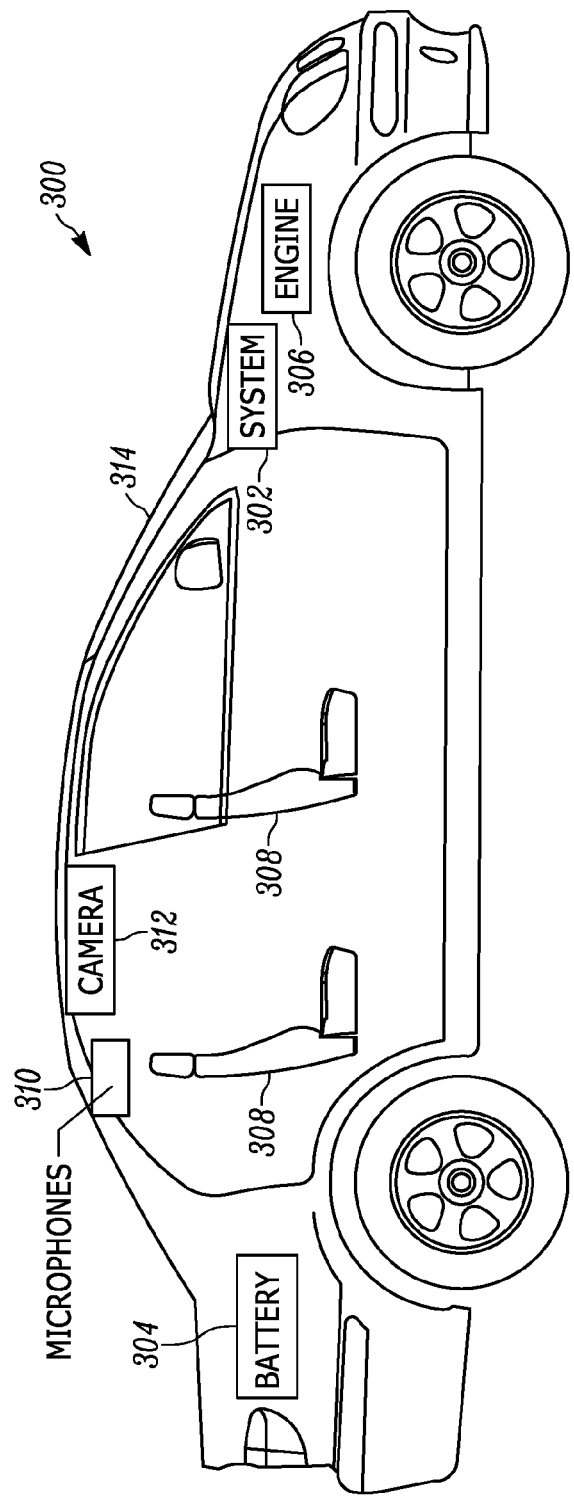
FIG. 3 is a block diagram of an example vehicle in accordance with present principles.

FIG. 3 shows an example vehicle 300 that may be similar to the vehicle 215 referenced above. The vehicle 300 may include a system 302 that may be similar to the system 100 described above and include components such as those set forth above in reference to the system 100. The vehicle may also include other vehicle components such as a battery 304 and an internal combustion engine 306 that powers the vehicle 300.

The vehicle 300 may also include plural seats or chairs 308 in which a driver and passengers in the vehicle 300 may sit. One or more microphones 310 may be disposed in the vehicle for detecting the voice of people within the vehicle 300 in accordance with the present disclosure, as well as one or more cameras 312 for gathering images of people within the vehicle 300 also in accordance with the present disclosure. As also shown in FIG. 3, the vehicle 300 may include a windshield 314 with an at least partially transparent "heads up" display integrated into it for presenting images and other information to people within the vehicle, including augmented reality objects and text information as disclosed herein. Though not shown for clarity, it is to be understood that the vehicle 300 may also include still other vehicle components, such as brakes for slowing and stopping the vehicle, a drivetrain and chassis, etc.

Figure 4:
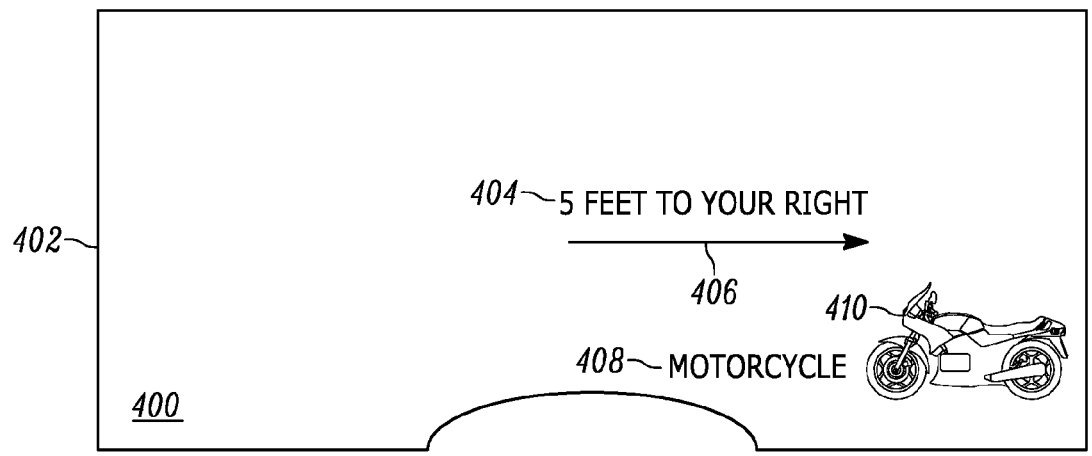
FIGS. 4-6 and 9 show example graphical user interfaces (GUIs) in accordance with present principles.

Referring now to FIG. 4, it shows an example graphical user interface (GUI) 400 presented on an at least partially transparent display 402 of a headset. The headset may be an augmented reality (AR) headset or smart glasses for example, and the GUI 400 may be presented using augmented reality (AR) software and/or virtual reality (VR) software. It is to be understood that the GUI 400 is shown from the perspective of a user while wearing the headset and viewing his or her real-world surroundings through the display 402, while also viewing content presented on the display such as the content shown in the bottom right portion which will be described in a moment.

Before describing the content, however, it may be helpful to understand why the content may be presented in the first place in accordance with present principles. Suppose another person other than the user of the headset is riding in the back seat of a vehicle the user is driving or is walking down a street with the user and says, "Hey, look at that" to the user. If the user cannot see the person's eyes to discern where the person is looking, or if the user is otherwise looking a different direction than the person, the user might not be able to discern what item or object the person is referring to. This may apply in instances where the item or object is a tangible real-world object, or where it is a virtual object presented as though existing in the real world using augmented reality software and/or virtual reality software.

In this type of situation, the user's headset may identify the person's exclamation to "look at that" and then receive input from a camera on the other person's device and/or a camera in the vehicle. The input may then be analyzed using eye tracking software to determine where the person is looking. In some embodiments, input from another camera on the person's own device and/or on the vehicle may also be used to help identify the item or object at which the person is looking if the item/object is an actual real-world object (assuming this other camera is oriented away from the person/vehicle to gather images of the person's field of view). However, in embodiments where the item/object is a virtual object, eye tracking alone may be executed to determine the virtual item/object at which the person is looking based on where on the device's display the user is identified looking. Once the direction/location of the item/object and its identity have been determined, content may be presented on the display 402 as shown in FIG. 4.

Thus, text 404 indicating "5 feet to your right" may be presented to indicate a distance to the subject of the person's exclamation relative to the current location and head orientation of the user. A non-text graphical object such as an arrow 406 may even be presented to indicate the direction in which the user may wish to look to view the subject of the person's exclamation. Still other content may also be provided to aid the user, such as text 408 indicating an identity of the object, which in this case may be a real-world motorcycle or a virtual motorcycle in a shared augmented reality setting. An icon or image 410 of a motorcycle may also be presented to further convey the subject of the person's exclamation, it being understood that the image 410 is not the subject itself of the person's exclamation but rather a representation of it to help the user locate the actual subject of the exclamation.

Furthermore, in some embodiments the graphical indications discussed above may be progressively presented. For instance, the text 404 and arrow 406 may be presented first. Then responsive to a non-zero threshold amount of time lapsing during which the user does not look in the direction of the object, the text 408 and image 410 may also be presented. Additionally, or alternatively, if the processor of the device might take a moment to identify the identity of the object (a "motorcycle"), then at least at first the direction in which the person was looking when making the exclamation may be presented if it has already been identified while the device continues to attempt to identify the object itself.

Figure 5:
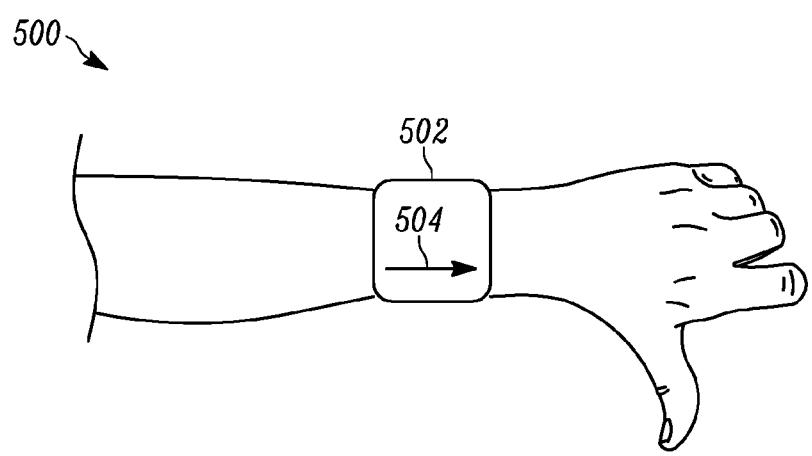

Another embodiment according to this motorcycle example is shown in FIG. 5. However, instead of presenting content on a headset for the user to locate the motorcycle, here the user is wearing a smart watch 500 that has a display 502. A graphical arrow 504 may be presented to indicate a direction in which the user may wish to look to view the motorcycle relative to the current location and head orientation of the user after the smart watch identifies its own location and orientation relative to the user to determine a direction in which the arrow 504 should point, as may be determined using orientation sensors in the watch 500 such as an accelerometer and gyroscope. Furthermore, note that even though only the arrow 504 is shown, if there is enough space on the display 502 then other content may also be presented such as text similar to the text 404 and 408 described above.

Figure 6:
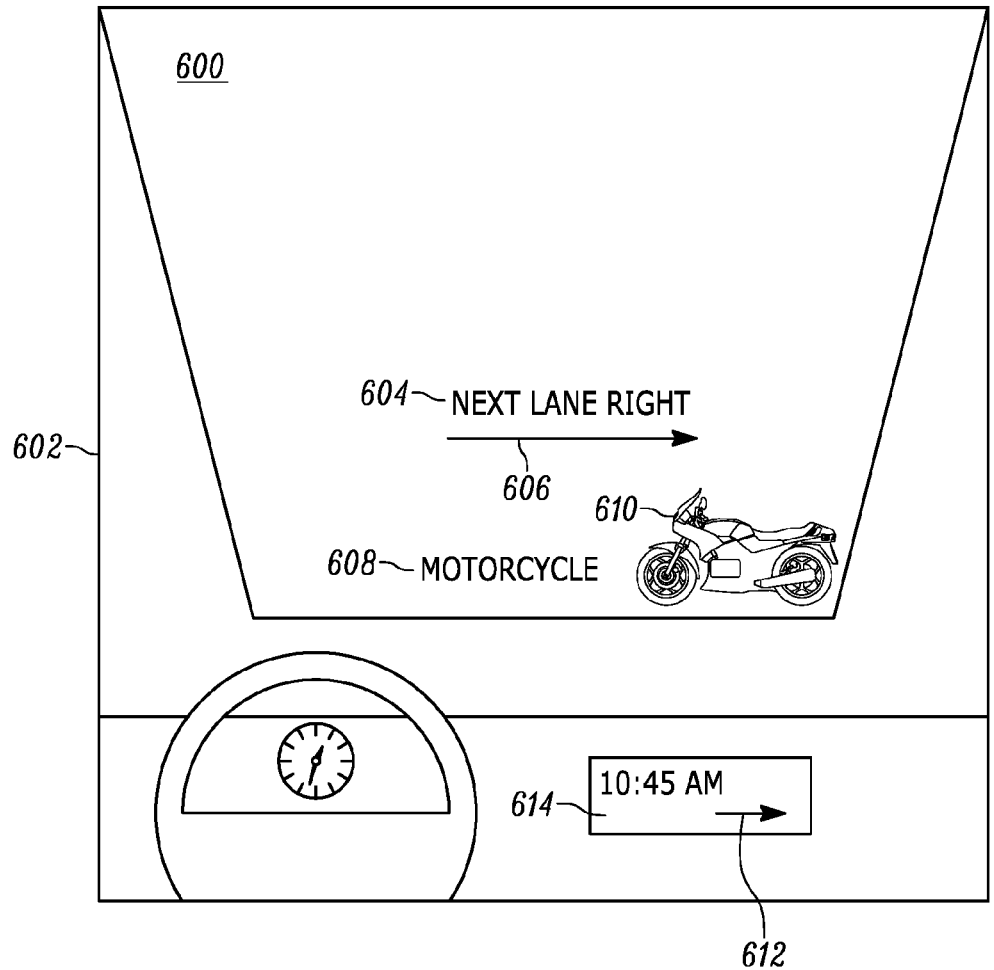

FIG. 6 shows yet another embodiment according to the motorcycle example. Here content is presented on the windshield 600 of a vehicle 602 via an at least partially transparent display integrated into the windshield 600. Text 604 may be presented that indicates a direction in which the user should look to view motorcycle, in this case expressed in terms of a next highway lane to the vehicle 602. An arrow 606 may also be presented indicating the direction in which the user may look to view the motorcycle, as well as a text identification 608 of the motorcycle and an icon 610 representing a motorcycle. Furthermore, in some embodiments another arrow 612 may be presented via the vehicle's on-board display 614 located in the dashboard of the vehicle 602.

In addition to the examples discussed above in relation to FIG. 4-6, graphical indications may be presented on the displays of other types of devices as well. For instance, graphical indications such as the ones described above may also be presented on the display of a smart phone or tablet computer engaged in presenting an AR environment, where a real-world camera feed is presented along with virtual objects rendered to appear as though existing in the real world using augmented reality (AR) software and/or virtual reality (VR) software.

Figure 7:
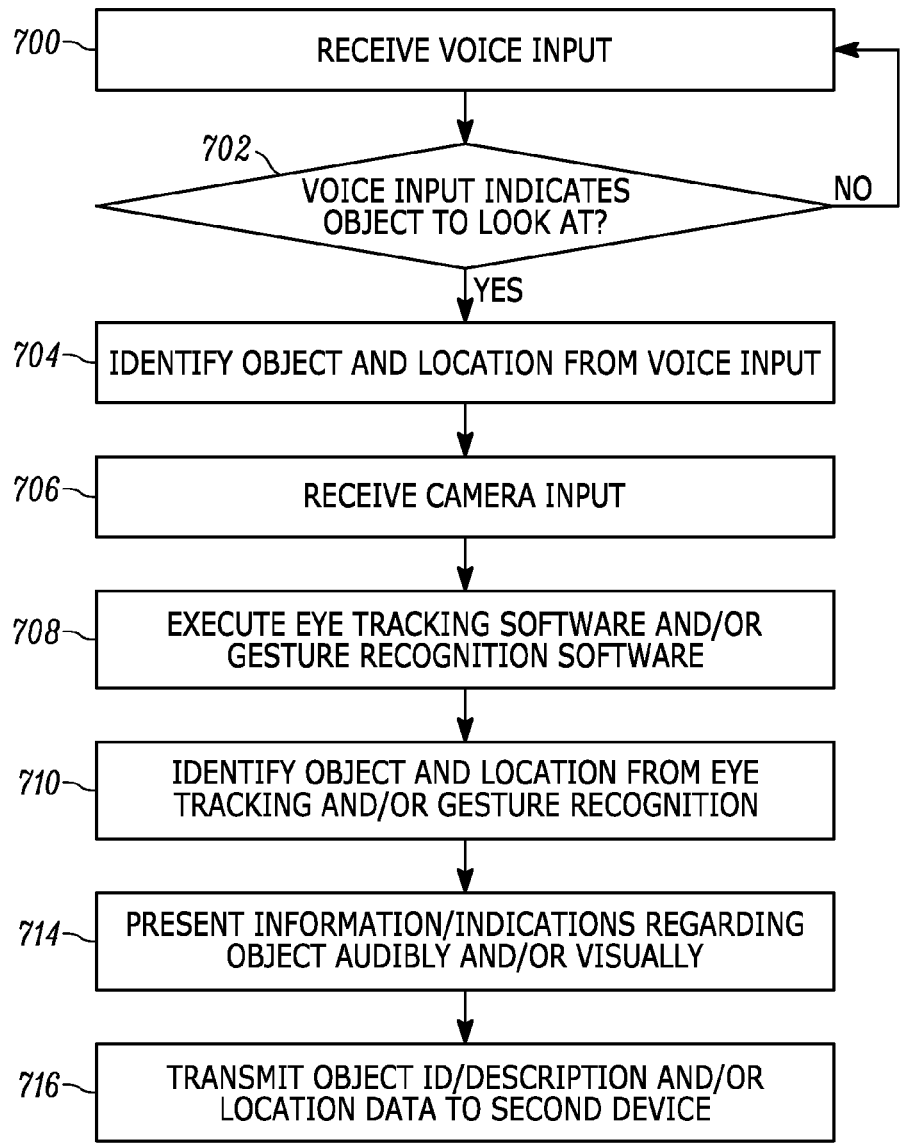
FIGS. 7 and 8 show flow charts of example algorithms in accordance with present principles.

FIG. 7 shows example logic that may be executed in accordance with present principles by a device such as the system 100, the user's device described above in reference to FIGS. 4-6, a vehicle, etc. However, note that in some embodiments the logic of FIG. 7 may also be executed by the device of another person that is making an exclamation for the user to look at a certain object. In any case, note that while FIG. 7 illustrates the logic in flow chart format, state logic or other equivalent logic may be used.

The logic of FIG. 7 begins at block 700 where the device may receive voice input from a microphone on the device and/or a microphone in communication with the device, such as a microphone in a vehicle or a microphone on the other person's device. Additionally, or alternatively, data indicating the voice input as text may be received from the other person's device if voice recognition was executed there to transcribe the voice input to text before providing it to the device undertaking the logic of FIG. 7.

But assuming input from a microphone itself is received at block 700, voice recognition software may then be executed to identify an exclamation from the voice input. To do so, the device may seek to identify one or more predefined phrases to trigger the ensuing logic. Additionally, or alternatively, the device may use natural language processing or an artificial intelligence learning (or other device learning) to identify a triggering phrase from the voice input. Examples of triggering phrases that may be predefined or otherwise identified include "look at that", "did you see that", "do you see that", "what is that", "that's cool" and "that's amazing". Other phrases may be predefined/defined by the user and/or learned by the device over time, such as a particular phrase the user's child might use often.

Thus, responsive to executing voice recognition on the voice input, at decision diamond 702 the device may determine whether the voice input includes a triggering phrase or otherwise indicates an object at which the user may wish to look. A negative determination may cause the logic to revert back to block 700 and either await further voice input or receive additional voice input already being provided. However, an affirmative determination at diamond 702 may instead cause the logic to proceed to block 704.

At block 704 the device may identify an object and location of the object via the voice input received at block 700 if indicated in the voice input. For example, the voice input may have included identifying information for the object such as object type, object color, object size, object location, etc.

Thereafter the logic may move to block 706. At block 706 the device may receive camera input, such as input from a camera disposed on the device, another camera in communication with the device such as a camera disposed within a vehicle, and/or a camera on the other person's device. Thereafter the logic may move to block 708 where the device may execute eye tracking software to determine a direction in which the person is looking and even a location at which the person is looking. The location may be identified in terms of its absolute location on the Earth, and/or in terms of its location relative to the person that made the exclamation as well as in terms of its location relative to the user of the device undertaking the logic of FIG. 7. Additionally, or alternatively, at block 708 the device may execute gesture recognition software to determine a direction in which the person is pointing, e.g., with one of the fingers on his or her hand.

Based on the functions executed at block 708, at block 710 the device may identify the object that is the subject of the person's exclamation and sight. To do so, if the object is a virtual object then the device may identify the object at which the user is looking as presented on the device's display based on execution of AR/VR eye tracking, with the object's identification being an identification indicated in pre-stored metadata for the object. If the object is a real-world object, then additional camera input from another camera may also be analyzed in some examples. For example, input from a different camera oriented in a direction to generate images of the person's field of view may be analyzed to, using object recognition software, identify an object disposed in the direction/location identified at block 708.

Then, if the logic of FIG. 7 is being executed in whole or in part by the user's device rather than the person making the exclamation, at block 714 the device may present information such as the indications discussed above in reference to FIGS. 4-6 on the device's display and/or another display in communication with the device. Additionally, or alternatively, information identifying the direction in which the object is located and even the object itself can be conveyed audibly via one or more speakers on the device using an automated voice. But in either case, to indicate the relative location of the object to the user, the device may identify the user's current location via a GPS transceiver or other location sensor on the device, and may also identify the user's current field of view/head orientation via camera input and/or motion sensor input, to deduce the location of the object relative to the user based on the identified absolute location of the object. Based on this, the device may then determine a direction and even distance at which the user should look to view the object and may generate content to indicate as much to the user.

If the logic of FIG. 7 is instead being executed by the device of the person making the exclamation, or if the logic is being executed by the user's device but information related to the object is to be forwarded to still another device, then at block 716 the device may transmit data indicating the object identification and its location (e.g., expressed in absolute location coordinates) to the other device(s).

Figure 8:
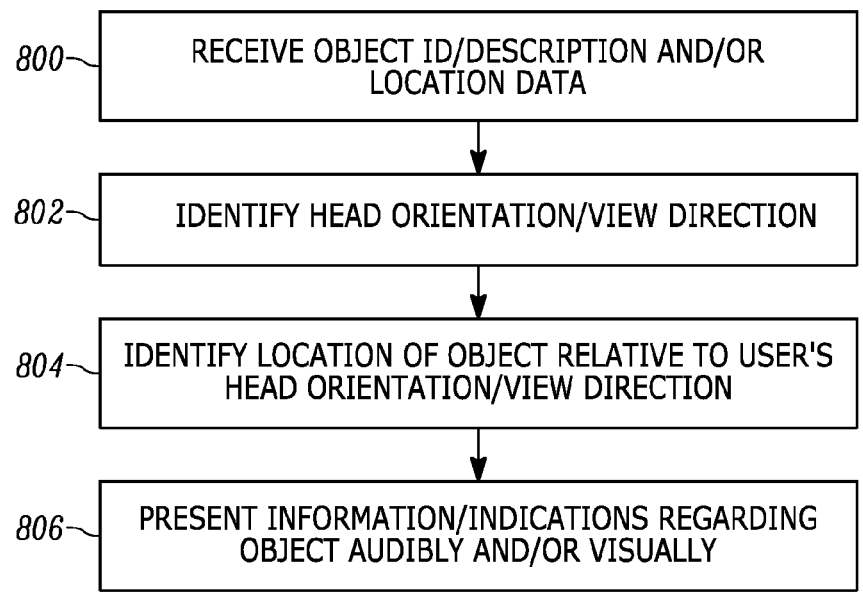

Continuing the detailed description in reference to FIG. 8, it also shows example logic that may be executed by a device such as the system 100, the user's device described in FIGS. 4-6, a vehicle, etc. in accordance with present principles. Note that while FIG. 8 illustrates the logic in flow chart format, state logic or other equivalent logic may be used.

It is to be understood that the logic of FIG. 8 may be executed by a user's device in embodiments where another person using another device has made an exclamation regarding an object and the other person's device has itself identified the object and its location (or supposed location in the real world if the object is virtual) to then transmit the object ID and/or location to the user's device. Thus, at block 800 the device may receive the object identification/description data and object location data from the other person's device.

Then at block 802 the device may identify the user's current head orientation and/or the current direction in which the user is looking. For head orientation, input from a camera oriented in the direction of the user's field of view may be used to extrapolate head orientation based on known locations for objects shown in images from the camera and a known location of the device (and hence known location of the user). If the device is a headset worn by the user, a gyroscope or other motion sensor on the device may also be used to identify the user's head orientation. As for identifying the current direction in which the user is looking, eye tracking software may be executed to identify the direction based on images received from a camera that shows the user's eyes.

From block 802 the logic may then proceed to block 804. At block 804 the device may identify the location of the object relative to the user's head orientation and/or the direction in which the user is looking. This may be done based on both the data received at block 800 (e.g., absolute location data for the object) and based on the head orientation/direction of viewing identified at block 802 by determining the location of the object relative to the user's location and head orientation/direction of viewing.

Thereafter the logic may proceed to block 806. At block 806 the device may present information to the user, such as the graphical indications discussed above in reference to FIGS. 4-6. This information may be presented on the device's display and/or another display in communication with the device, such as a display integrated into the windshield (or another window) of a vehicle in which the user and person might be disposed. Additionally, or alternatively, the information may be presented audibly to the user via one or more speakers in communication with the device, such as speakers on the device itself or speakers within the vehicle.

Figure 9:
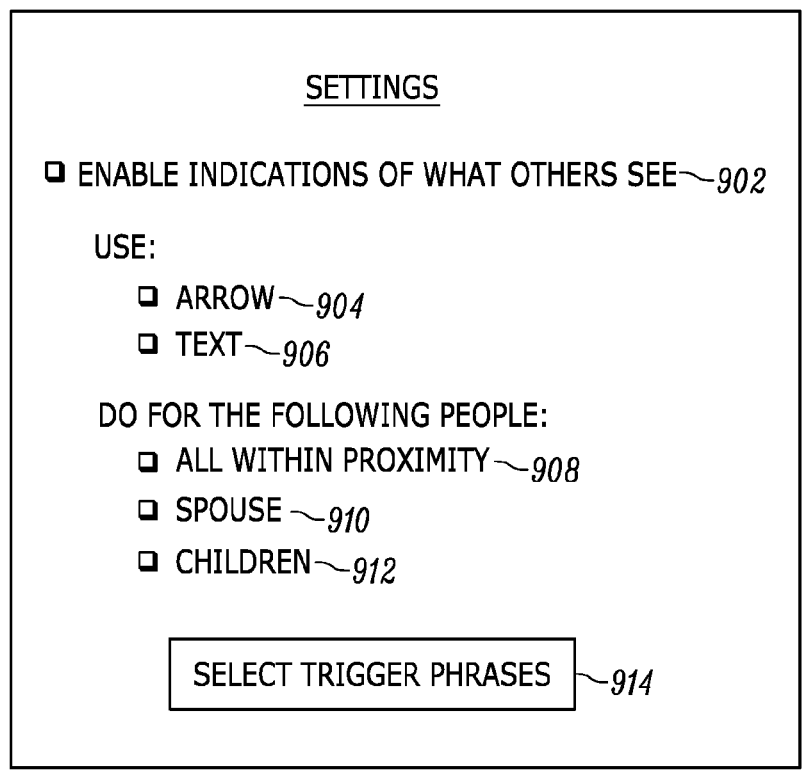

Reference is now made to FIG. 9, which shows an example graphical user interface (GUI) 900 presentable on a display of a device undertaking present principles. The GUI 900 may be used to configure one or more settings of the device related to present principles. For example, an option 902 may be selected to enable or configure the device to present indications of objects that are the subject of other people's exclamations. Thus, the option 902 may be selected to enable the device to undertake the logic of FIGS. 7 and 8, as well as to present the graphical indications discussed above in reference to FIGS. 4-6. The option 902 itself may be selected by directing touch or cursor input to the adjacent check box, which is how the other options to be discussed below may also be selected in this example.

The GUI 900 may also include options 904, 906 for selecting respective different types of graphical indications to present in accordance with present principles. Thus, option 904 may be selected to command the device to present arrows or other non-text graphical indications regarding an object, while option 906 may be selected to command the device to present textual graphical indications regarding an object.

The GUI 900 may also include options 908, 910, and 912 for selecting one or more respective people that might make exclamations for which graphical indications should be provided. Accordingly, option 908 may be selected to command the device to present graphical indications for all people within proximity to the user and/or device when an exclamation is made, such as those within a threshold non-zero distance of ten feet to the user/device. Also, option 910 may be selected to command the device to present graphical indications for objects that are the subject of exclamations from the user's spouse, while option 912 may be selected to command the device to present graphical indications for objects that are the subject of exclamations from the user's children. The other people themselves may be identified from microphone input of the exclamations based on execution of voice recognition software, and/or the other people may be identified based on receiving data from devices already associated with those respective people.

Still in reference to FIG. 9, the GUI 900 may also include a selector 914 that is selectable to initiate a process by which the user may predefine one or more trigger phrases in accordance with present principles. The process itself may include the user himself or herself speaking desired trigger phrases when prompted by the device, and/or the user himself or herself providing input to the input box of another GUI that might be presented to specify the trigger phrases via keyboard input.

Moving on from the description of FIG. 9, it is to be understood that present principles may apply in instances where more than two people with respective devices are present. In these types of situations, if one person where to address another person while making an exclamation about an object, the person being addressed may be identified from the exclamation and graphical indications in accordance with present principles may only be presented at the device of the person being addressed. For example, if a mother and father were riding in front seats of a vehicle while their child was riding in one of the back seats and the child exclaimed "Hey mom, look at that", then graphical indications may be presented on the display of the mother's headset/device but not the father's headset/device.

It may now be appreciated that present principles are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
   at least one processor;
   a display accessible to the at least one processor; and
   storage accessible to the at least one processor and comprising instructions executable by the at least one processor to:
   receive input regarding an item at which a person is looking; and
   present information regarding the item to a user via the display, the user being different from the person;
   wherein the input comprises input received from at least one camera in communication with the first device;
   wherein input received from the at least one camera is processed using eye tracking to identify first data related to where the person is looking, and wherein the first data is used to present the information; and
   wherein input received from the at least one camera is processed using gesture recognition to identify second data related to where the person is gesturing with at least a portion of the person's arm, and wherein the second data is used to present the information.

2. The first device of claim 1, wherein the information identifies the item.

3. The first device of claim 1, wherein the information indicates a direction in which the item can be viewed by the user relative to a current head orientation of the user.

4. The first device of claim 1, wherein the device comprises a headset and wherein the display is an at least partially transparent display disposed on the headset.

5. The first device of claim 4, wherein the information is presented using one or more of augmented reality processing and virtual reality processing.

6. The first device of claim 1, wherein the first device comprises a vehicle, and wherein the display is integrated into one or more of a windshield of the vehicle and a window of the vehicle.

7. The first device of claim 1, wherein the input regarding the item is received from a second device different from first device, the second device comprising a headset worn by the person.

8. The first device of claim 1, wherein the information is presented responsive to detection by the first device of the person verbally indicating the item, the detection being based at least in part on input from a microphone in communication with the first device.

9. A computer readable storage medium (CRSM) that is not a transitory signal, the computer readable storage medium comprising instructions executable by at least one processor to:
   receive input regarding a first item at which a person is looking as presented on a first electronic display, wherein the input indicates a predetermined phrase as being spoken by the person;

based on the input, present information regarding the first item to a user via a second electronic display different from the first electronic display, the user being different from the person;

identify, at a first device comprising the second electronic display, information related to a second item at which the user is looking as presented on the second electronic display; and transmit, to a second device comprising the first electronic display, data regarding the location of the second item, wherein the first device is different from the second device.

10. The CRSM of claim 9, wherein the information related to the second item is identified at least in part based on microphone input received from a microphone on the first device.

11. The CRSM of claim 9, wherein the input indicating the first item at which the person is looking comprises microphone input.

12. The CRSM of claim 9, wherein the input is first input, and wherein the instructions are executable to:

receive second input indicating the first item at which the person is looking, wherein the second input is related the person gesturing toward the first item with at least a portion of the person's arm; and based on both the first input and the second input, present the information via the second electronic display.

13. The CRSM of claim 12, wherein the second input is input generated based at least in part on execution of gesture recognition.

14. A method, comprising:

receiving input regarding an item at which a person is looking; and presenting information regarding the item to a user via a display of a device, the user being different from the person;

wherein the input comprises input received from at least one camera in communication with the device;

wherein input received from the at least one camera is processed using eye tracking to identify first data related to where the person is looking, and wherein the first data is used to present the information; and wherein input received from the at least one camera is processed using gesture recognition to identify second data related to where the person is gesturing with at least a portion of the person's arm, and wherein the second data is used to present the information.

15. The method of claim 14, wherein the information identifies the item.

16. The method of claim 14, wherein the information indicates a direction in which the item can be viewed by the user relative to a current head orientation of the user.

17. The method of claim 14, wherein the information is presented using one or more of augmented reality processing and virtual reality processing.

18. The method of claim 14, wherein the information is presented responsive to detection by the device of the person verbally indicating the item, the detection being based at least in part on input from a microphone in communication with the device.

* * * * *